(12) United States Patent
Davis et al.

(10) Patent No.: US 12,145,146 B2
(45) Date of Patent: *Nov. 19, 2024

(54) MOTION SYSTEMS FOR LOADING TIPS

(71) Applicant: Beckman Coulter, Inc., Brea, CA (US)

(72) Inventors: Matthew S. Davis, Indianapolis, IN (US); Ronald Douglas Johnson, Westfield, IN (US); Mark A. Nierzwick, Brownsburg, IN (US); Craig A. Hudson, Brownsburg, IN (US); Charles M. Neese, East Pittsboro, IN (US); Mark F. Sauerburger, Zionsville, IN (US); John S. Snider, Brownsville, IN (US)

(73) Assignee: Beckman Coulter, Inc., Brea, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/057,652

(22) Filed: Nov. 21, 2022

(65) Prior Publication Data

US 2023/0158484 A1    May 25, 2023

Related U.S. Application Data

(63) Continuation of application No. 16/477,823, filed as application No. PCT/US2018/012959 on Jan. 9, 2018, now Pat. No. 11,534,750.
(Continued)

(51) Int. Cl.
*B01L 3/02* (2006.01)
*B01L 9/00* (2006.01)
*B01J 19/00* (2006.01)

(52) U.S. Cl.
CPC ............. *B01L 3/0275* (2013.01); *B01L 9/543* (2013.01); *B01J 19/0046* (2013.01);
(Continued)

(58) Field of Classification Search
None
See application file for complete search history.

(56) References Cited

U.S. PATENT DOCUMENTS 5,306,510 A    4/1994    Meltzer
6,143,252 A    11/2000    Haxo, Jr. et al.
(Continued)

FOREIGN PATENT DOCUMENTS

CN    102941132 A    2/2013
EP    0982980 B1    1/2000
(Continued)

OTHER PUBLICATIONS

International Search Report and Written Opinion for PCT/US2018/012959, mailed May 11, 2018.

*Primary Examiner* — Brian R Gordon
(74) *Attorney, Agent, or Firm* — Merchant & Gould P.C.

(57) ABSTRACT

Embodiments of lab automation workstations are disclosed in which the pod that performs pipetting operations is integrated with pipette tip-loading functionality. To generate the necessary tip-loading force, a dual drive system is used that is symmetric about the Y-axis to allow for offset or partial tip box loads by dynamically centering the drive force (e.g., the tip-loading force) over the reaction load. This minimizes the need for oversized linear motion components while still allowing for the generation of high tip-loading forces needed to properly load a large number of pipette tips simultaneously.

13 Claims, 11 Drawing Sheets

Related U.S. Application Data

(60) Provisional application No. 62/446,124, filed on Jan. 13, 2017.

(52) U.S. Cl.
CPC ..... *B01L 2200/025* (2013.01); *B01L 2200/14* (2013.01); *B01L 2300/0829* (2013.01); *B01L 2400/0487* (2013.01)

(56) References Cited

U.S. PATENT DOCUMENTS

| | | | |
|---|---|---|---|
| 6,818,394 B1 * | 11/2004 | O'Donnell-Maloney | C07H 21/00 435/177 |
| 11,213,813 B2 * | 1/2022 | Higuchi | B01L 3/0268 |
| 2002/0168300 A1 * | 11/2002 | Bramwell | B01L 9/543 211/74 |
| 2003/0180128 A1 * | 9/2003 | DeWinter | G01N 1/2813 414/222.07 |
| 2003/0190263 A1 * | 10/2003 | Yiu | B01L 3/0279 422/525 |
| 2004/0047765 A1 * | 3/2004 | Gordon | G01N 35/1004 422/63 |
| 2005/0084423 A1 * | 4/2005 | Zarowitz | B01L 3/021 422/504 |
| 2005/0136534 A1 * | 6/2005 | Austin | G01N 35/1009 427/2.11 |
| 2005/0214930 A1 * | 9/2005 | Bynum | B01L 99/00 435/287.2 |
| 2006/0211132 A1 * | 9/2006 | Miledi | B01L 3/0265 436/180 |
| 2007/0221684 A1 * | 9/2007 | Steinbrenner | B67D 99/00 222/267 |
| 2009/0129985 A1 | 5/2009 | Ikushima | |
| 2010/0248981 A1 * | 9/2010 | Shirazi | B01L 9/523 506/7 |
| 2010/0258578 A1 | 10/2010 | Motadel | |
| 2011/0268628 A1 | 11/2011 | Warhurst et al. | |
| 2011/0296931 A1 | 12/2011 | Warhurst | |
| 2013/0280145 A1 | 10/2013 | West et al. | |
| 2013/0312546 A1 * | 11/2013 | Wada | G01N 21/05 73/864.11 |
| 2015/0037803 A1 | 2/2015 | Park | |
| 2016/0299165 A1 * | 10/2016 | Zhou | G01N 33/50 |
| 2016/0330436 A1 * | 11/2016 | Jarok | G01C 21/18 |
| 2016/0332156 A1 * | 11/2016 | Tajima | B01L 3/0275 |
| 2017/0021356 A1 * | 1/2017 | Dority | B01L 7/52 |
| 2017/0219614 A1 * | 8/2017 | Cook | B01L 3/50851 |
| 2018/0059132 A1 * | 3/2018 | Christey | G06T 7/74 |
| 2018/0127696 A1 * | 5/2018 | Takeuchi | C12M 41/48 |
| 2018/0154349 A1 * | 6/2018 | Habbal | G01N 35/1011 |
| 2019/0107547 A1 * | 4/2019 | VanSickler | B01L 9/54 |
| 2019/0314808 A1 * | 10/2019 | Wilmer | B01L 3/0275 |
| 2019/0391173 A1 * | 12/2019 | Bolli | B01L 3/0224 |
| 2020/0200779 A1 * | 6/2020 | Sigler | B01L 3/0237 |
| 2021/0106985 A1 * | 4/2021 | Tajima | G01N 21/76 |

FOREIGN PATENT DOCUMENTS

| | | |
|---|---|---|
| JP | 200159799 A | 3/2001 |
| JP | 2001165942 A | 6/2001 |
| JP | 2006177948 A | 7/2006 |
| JP | 2008304447 A | 12/2008 |
| JP | 2011516893 A | 5/2011 |
| JP | 2013530818 A1 | 8/2013 |
| JP | 6693819 B2 | 4/2020 |
| WO | 02085521 A1 | 10/2002 |

* cited by examiner

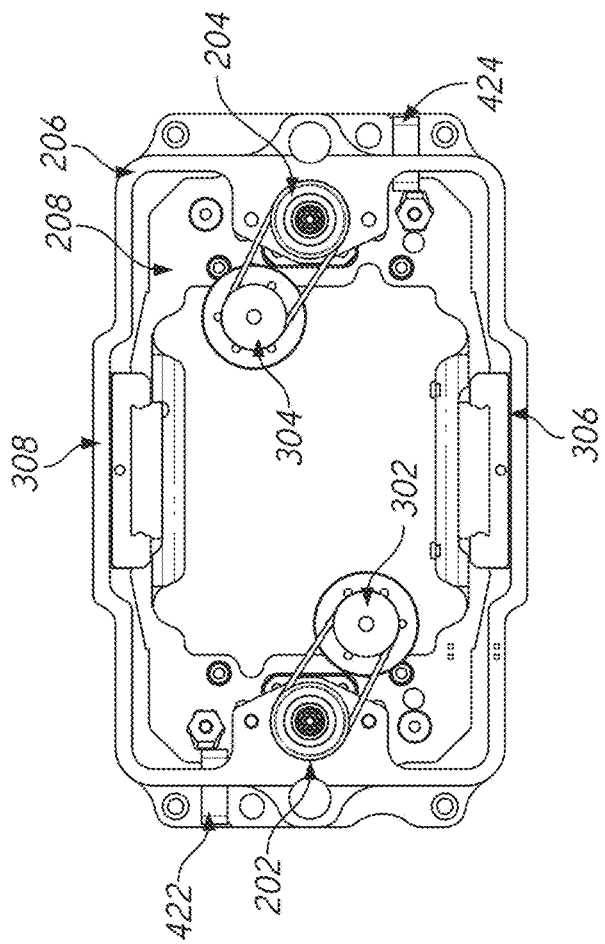
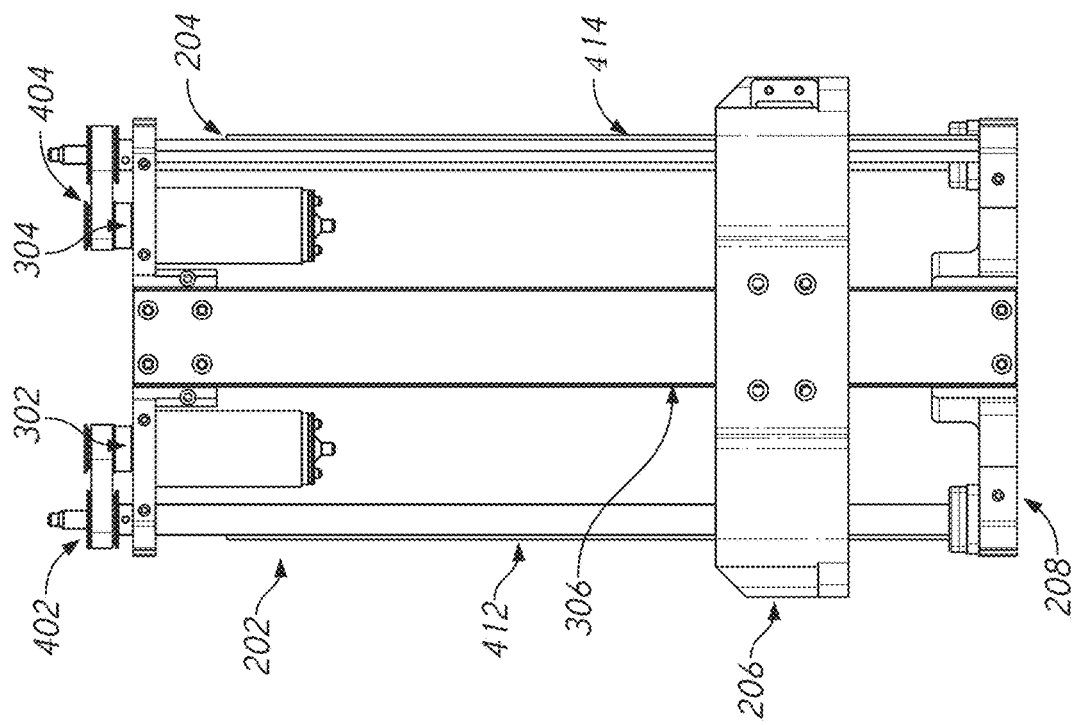
FIG. 4B
FIG. 4A

MOTION SYSTEMS FOR LOADING TIPS

CROSS-REFERENCE TO RELATED APPLICATIONS

The present application is a Continuation of U.S. application Ser. No. 16/477,823, filed on Jul. 12, 2019, now U.S. Pat. No. 11,534,750, which is a PCT National Stage Application of International Application No. PCT/US2018/012959, filed on Jan. 9, 2018, which claims priority to U.S. Provisional Application No. 62/446,124, filed Jan. 13, 2017, the disclosures of which are hereby incorporated by reference in their entireties. To the extent appropriate a claim of priority is made to each of the above-disclosed applications.

FIELD

Methods and systems disclosed herein relate generally to lab automation workstations and related devices for the precise handling of liquids. More specifically, the various designs and techniques disclosed herein can be used with lab automation workstations in order to better integrate the loading of pipette tips into the lab workflow, resulting in a more-convenient and more-efficient loading of pipette tips.

BACKGROUND

Lab automation workstations, which are sometimes referred to as liquid handling robots or pipette workstations, are frequently used in the automation of chemical and biochemical laboratories to facilitate the precise handling of liquids. These robots often use a motorized pipette or syringe to dispense a selected volume of liquid (e.g., a reagent, sample, etc.) into designated containers.

More complex lab automation workstations may have design configurations that allow them to mimic the operations of humans and reproduce pipetting procedures used by humans in order to perform liquid transfers. For example, such workstations may be able to precisely manipulate the position of the pipette dispensers and containers in order to perform advanced operations such as the mixing of liquids. Some of these workstations may have an arm that allows for precise, 3-axis movement of the pipette dispensers.

The various components of the lab automation workstation may be managed by control software, either on a connected computer or integrated into the system itself. The control software may allow the user to customize the liquid handling procedures and transfer volumes, as well as manipulate the various components of the workstation to perform the desired liquid handling procedures.

Some lab automation workstations may be configured for multiple pipette dispensers and the simultaneous use of multiple pipette tips. However, the simultaneous loading of multiple pipette tips for use by these workstations may require the use of a relatively large amount of force that has to be appropriately applied to the pipette tips. Thus, a lab automation workstation may have to be specifically designed to properly apply that force. Embodiments of the invention solve these and other problems individually and collectively.

BRIEF SUMMARY

Embodiments of lab automation workstations are disclosed in which the pod that performs pipetting operations with pipette tips is integrated with pipette tip-loading functionality. In order to integrate the pipette tip-loading functionality, the components for two or more drives in the Z-axis can be included in the pod in order to generate the desired tip-loading forces at the appropriate locations. In some embodiments, a dual drive system that is symmetric about the Y-axis can be used. The system allows for offset or partial tip box loads by dynamically centering the drive force (e.g., the tip-loading force) over the reaction load. Such a system also minimizes the need for oversized linear motion components while still allowing for the generation of high tip-loading forces needed to properly load a large number of pipette tips simultaneously. Furthermore, the use of two identical sets of components in the dual drive system allows the components to be downsized as each set of components for a drive is only required to generate about half of the total tip-loading force needed.

In some embodiments, a motion system is disclosed that comprises: a first drive screw; a second drive screw parallel to the first drive screw, the first drive screw independently rotatable relative to the second drive screw; a platform including a first location, the platform configured to engage the first drive screw and the second drive screw, wherein activation of the first drive screw and the second drive screw displaces the platform, and wherein the first location is offset from the first drive screw and from the second drive screw; a position sensor configured to measure a first position of the platform at the first location; and a first force sensor configured to detect a first force from the first drive screw.

In certain embodiments, the motion system may further comprise a second force sensor configured to detect a second force from the second drive screw. In certain embodiments, the platform further includes a second location offset from the first drive screw, from the second drive screw, and from the first location, and wherein the position sensor is further configured to measure a second position of the platform at the second location. In certain embodiments, the platform is subdivided into a first area and a diagonally opposed second area by a centerline and a midline, the centerline intersecting the centers of the first drive screw and the second drive screw and the midline perpendicular to the centerline through the midpoint of the centerline, and wherein the first location is disposed in the first area and the second location is disposed in the second area. In certain embodiments, the position sensor includes a first linear encoder adjacent the first location and a second linear encoder adjacent the second location. In certain embodiments, the motion system further comprises a motor operatively coupled to the first drive screw, wherein the first force sensor comprises a winding of the motor.

In some embodiments, a pipette workstation is disclosed that comprises a deck configured to support a plurality of pipette tips; a pipettor head engaged to a first drive screw and a second drive screw, the pipettor head disposed above the deck and movable with respect to the deck in response to a torque applied to the first drive screw and a torque applied to the second drive screw, wherein, when the plurality of pipette tips is present, the plurality of pipette tips produce an insertion force on the pipettor head; a first force sensor coupled to the first drive screw and configured to detect a first value of the insertion force; and a controller configured to adjust the torque of the first drive screw in response to the detected first value of the insertion force.

In certain embodiments, the pipette workstation may further comprise a second force sensor coupled to the second drive screw and configured to detect a second value of the insertion force. In certain embodiments, the pipette workstation may further comprise a first linear encoder and a second linear encoder offset from the first linear encoder, the first linear encoder configured to measure a first position of the pipettor head and the second linear encoder configured to measure a second position of the pipettor head, wherein the controller is further configured to adjust the torque of the second drive screw in response to the first position and the second position. In certain embodiments, the controller is configured to apply a torque to the first drive screw to produce a predetermined first value of the insertion force. In certain embodiments, the controller is configured to apply a torque to the second drive screw to maintain the measured second position level with the measured first position. In certain embodiments, the controller is configured to apply a torque to the second drive screw to produce a predetermined second value of the insertion force. In certain embodiments, the pipettor head is subdivided into a first area and a diagonally opposed second area by a centerline and a midline, the centerline intersecting the centers of the first drive screw and the second drive screw and the midline perpendicular to the centerline through the midpoint of the centerline, and wherein the first position is measured in the first area and the second position is measured in the second area. In certain embodiments, the pipettor head includes a plurality of mandrels each configured to engage a pipette tip, and wherein, when the plurality of mandrels engage the plurality of pipette tips, fewer than all of the plurality of mandrels are engaged.

In some embodiments, a method is disclosed of driving a pipettor head subject to an off-center load, the method comprising: moving a pipettor head to engage an off-center load, the pipettor head engaging a first drive screw and a second drive screw independently rotatable relative to the first drive screw; measuring a first position of the pipettor head at a first location and a second position of the pipettor head at a second location; measuring a first force transmitted from the off-center load by the first drive screw; calculating a first torque and a second torque based upon a set of parameters including the first force, the first position, the second position, and a representation of the off-center load; and applying the first torque to the first drive screw and the second torque to the second drive screw.

In certain embodiments, the first torque is greater than the second torque. In certain embodiments, the method further comprises measuring a second force transmitted from the load by the second drive screw. In certain embodiments, the set of parameters includes the first force and two or more of the second force, the first position, the second position, and the representation of the off-center load. In certain embodiments, the first torque and the second torque produce a predetermined force at the off-center load. In certain embodiments, the first torque and the second torque levels the pipettor head while engaged with the off-center load.

BRIEF DESCRIPTION OF THE DRAWINGS

The present disclosure is described in conjunction with the appended figures:

FIG. 4A shows a side perspective view of the internal components of a pod used in example embodiments of a lab automation workstation.

FIG. 4B shows a top-down view of the internal components of a pod used in example embodiments of a lab automation workstation.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiments only, and is not intended to limit the scope, applicability or configuration of the disclosure. Rather, the ensuing description of the preferred exemplary embodiments will provide those skilled in the art with an enabling description for implementing various embodiments. It is understood that various changes may be made in the function and arrangement of elements without departing from the spirit and scope as set forth in the appended claims.

Overview and Context

Some lab automation workstations may be configured for multiple pipette dispensers and the simultaneous use of multiple pipette tips. However, the simultaneous loading of multiple pipette tips for use by these workstations may require the use of a relatively large amount of force that has to be appropriately applied to the pipette tips. Thus, a lab automation workstation may have to be specifically designed to properly apply that force.

It should be noted that FIGS. 1A-1D show example embodiments of a lab automation workstation that utilize an external tip loader to supply the large amounts of force necessary needed to load pipette tips for use by the workstation. However, such embodiments of the workstation utilizing an external tip loader are provided for exemplary purposes and are not intended to be limiting. Instead, the external tip loader is described in order to better facilitate understanding and provide context for this disclosure.

Figure 1A:
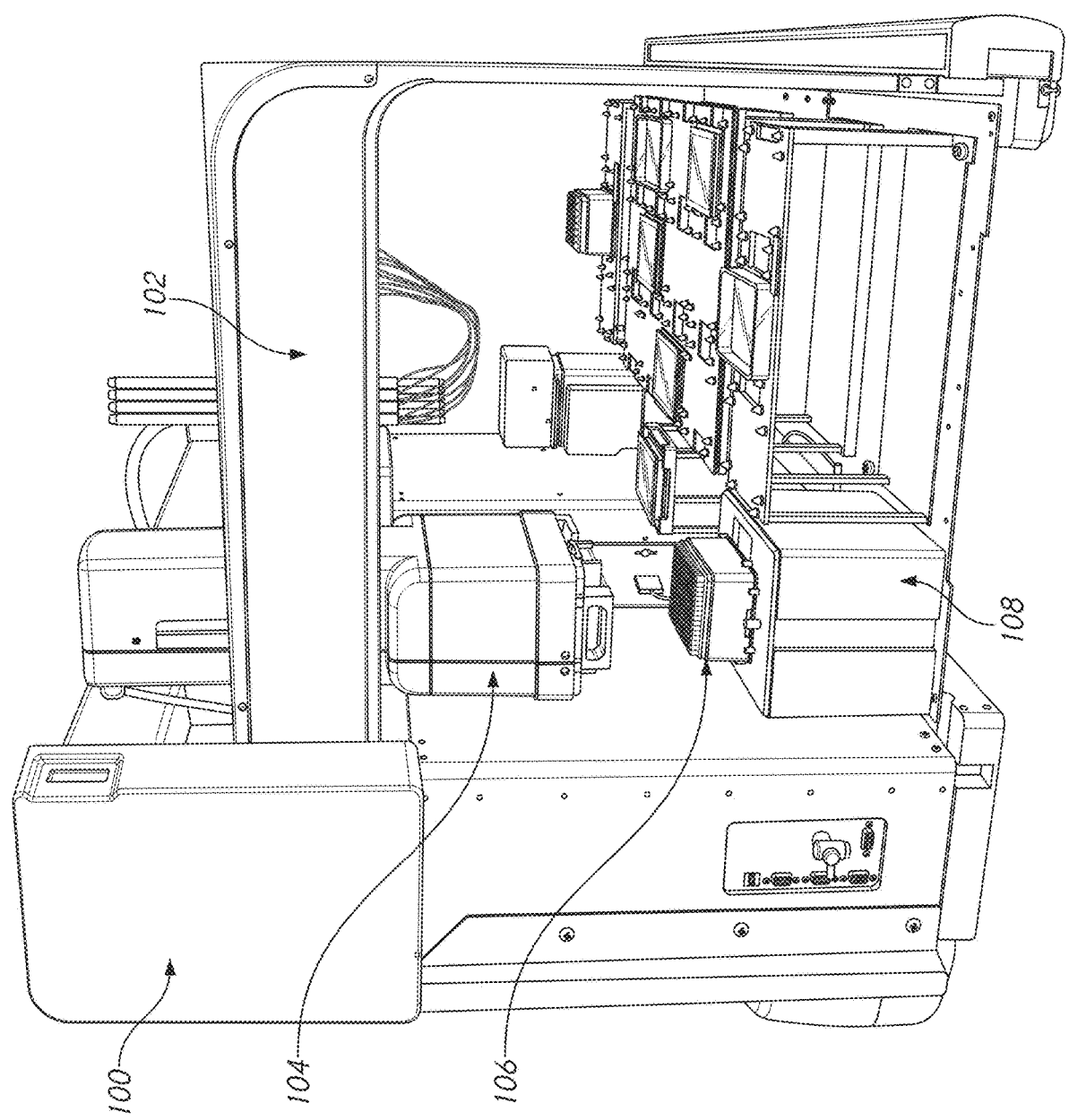
FIG. 1A shows a perspective view of example embodiments of a lab automation workstation that utilize an external tip loader.

With regards to the figures, FIG. 1A shows an example embodiment of a lab automation workstation 100, which may include any combination of the various systems or components shown. For example, the lab automation workstation 100 may include one or more (or none) each of an arm 102, a pod 104, a tip tray 106, and an external tip loading station 108. An overview of these various components of the lab automation workstation 100 is provided below.

In some embodiments, the lab automation workstation 100 may include an arm 102. In some of such embodiments, the arm 102 may be movable along one or more axes. For example, the arm 102 may be laterally slideable along the length of the lab automation workstation 100. In some embodiments, the lab automation workstation 100 may include a pod 104 that is mechanically coupled to the arm 102. As shown in the figure, the pod 104 may have an elongate housing in the vertical axis that is held upright by the arm 102. The bottom of the pod 104, which is shown in more detail in FIG. 1B, may be configured to interface and/or connect to one or more pipette tips. In some of such embodiments, the pod 104 may be moveable along the arm 102 in one or more axes. For example, as shown in the figure the pod 104 may be laterally slideable along the length of the arm 102. Furthermore, in some embodiments, the pod 104 may be vertically slideable relative to the arm such that the bottom of the pod 104 can be positioned higher or lower. Accordingly, the bottom of the pod 104 may be re-positioned with precise, 3-axis movement by adjusting a combination of: the height of the pod 104 relative to the arm 102 (e.g., the Z-axis), the lateral position of the pod 104 along the arm 102 (e.g., the Y-axis), and the lateral position of the arm 102 along the length of the lab automation workstation 100 (e.g., the X-axis).

In some embodiments, the pod 104 may be a multichannel pod which is configured for interfacing with, and connecting to, multiple pipette tips that can be simultaneously used to perform pipetting operations. In some embodiments, the pod 104 may contain various components that allow for various pipetting and fluid-handling operations to be performed using attached pipette tips.

In some embodiments, the lab automation workstation 100 may be configured to allow the bottom of the pod 104 to be re-positioned over a tip tray 106, as shown in the figure. In some of such embodiments, the tip tray 106 may rest on top of the external tip loading station 108. The tip tray 106 may contain one or more pipette tips usable for handling liquids. These pipette tips often come sterilized and are held in rows and/or columns of the tip tray 106. Pipette tips in various sizes or shapes, and the tip tray 106 used to hold them may also come in different sizes or shapes in order to accommodate varying numbers and configurations of pipette tips. A non-limiting example of a tip tray 106 is shown in additional detail in FIG. 1D. Some common configurations of the tip tray 106 include designs for holding 96 or 384 pipette tips. This allows for pipetting liquid into 96-well or 384-well plates, with a pipette tip for each well.

Figure 1B:
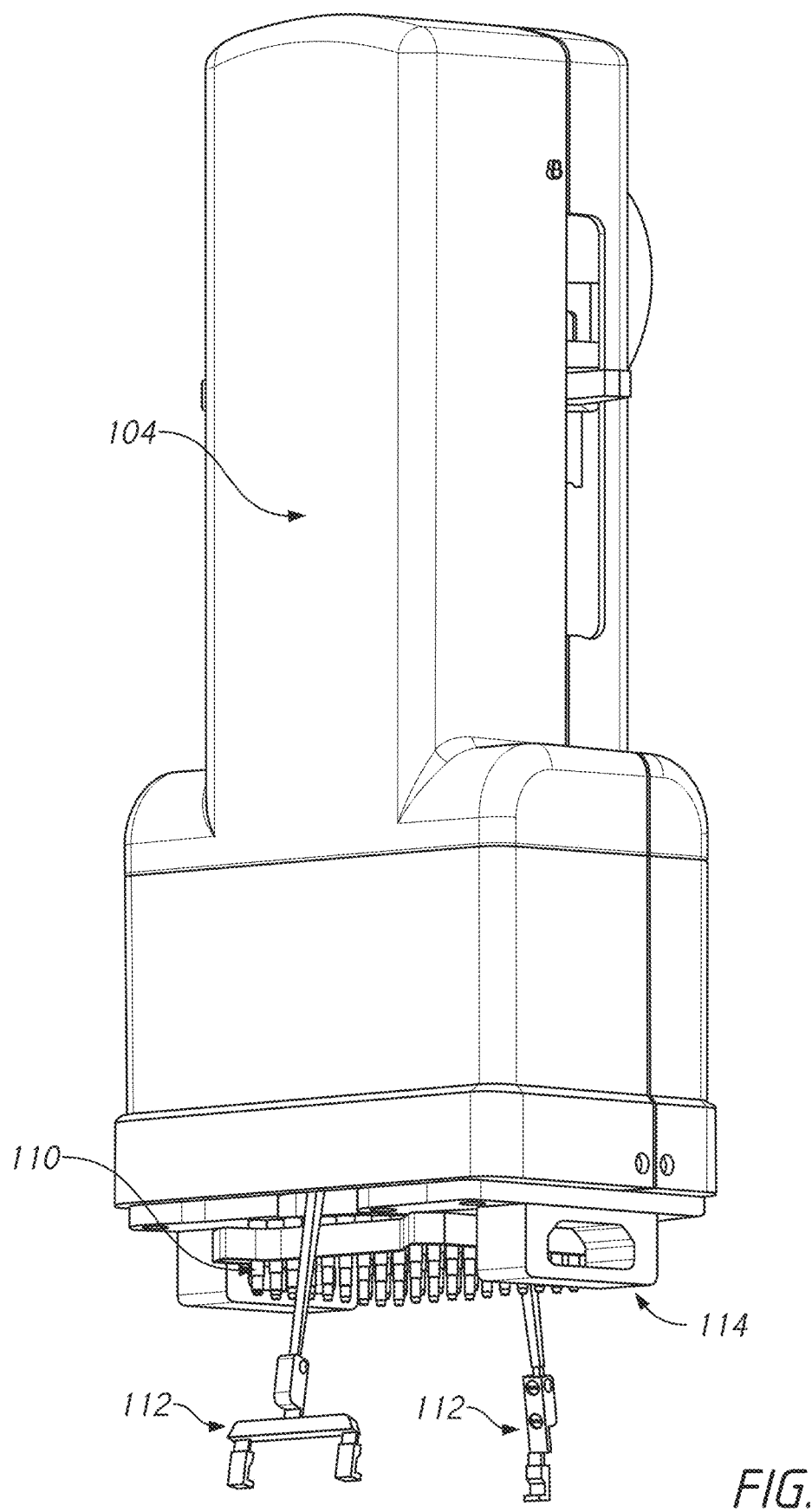
FIG. 1B shows a perspective view of a pod used in example embodiments of a lab automation workstation.
Figure 1C:
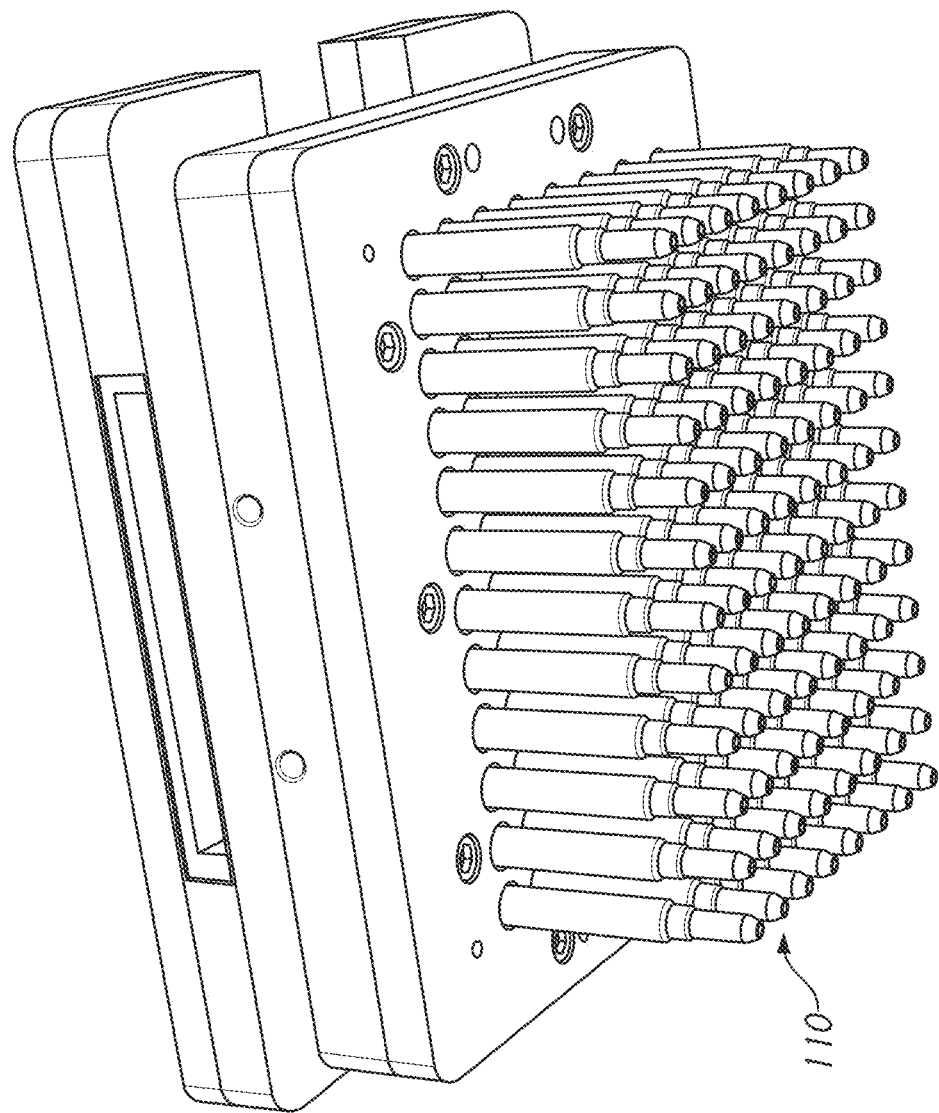
FIG. 1C shows a perspective view of mandrels used in example embodiments of a lab automation workstation.

In some embodiments, the lab automation workstation 100 is configured to re-position the bottom of the pod 104 over the top of the pipette tips held in the tip tray 106. In some of such embodiments, the external tip loading station 108 may be configured to provide an upward force against the bottom of the pipette tips held in the tip tray 106, which pushes the pipette tips upwards towards the bottom of the pod 104. In some embodiments, the pod 104 may have a set of mandrels configured to receive the top of the pipette tips. Non-limiting examples of the mandrels are shown in FIG. 1B and FIG. 1C. The top of the pipette tips may be configured to attach to the mandrels via a friction fit. Thus, pushing the pipette tips in the tip tray 106 upwards towards the mandrels located at the bottom of the pod 104 (which is positioned over the pipette tips) may force the pipette tips onto the mandrels and provide an air-tight connection between the pipette tips and the mandrels.

However, it should be noted that since each pipette tip may be configured to attach to a mandrel via friction fit, the amount of force necessary to push that pipette tip onto the mandrel, and create an air-tight connection between that pipette tip and the mandrel, can be relatively large. Furthermore, since a tip tray 106 may have a large number of pipette tips (e.g., as many as 96 or 384—or even greater), the amount of force necessary to simultaneously push all of those pipette tips onto the mandrels to produce air-tight connections can be enormous. In some embodiments, simultaneously loading 384 pipette tips onto the mandrels may require 500 or more pounds of force.

FIG. 1B shows an example embodiment of the pod 104 of the lab automation workstation 100. In some embodiments, the pod 104 may include mandrels 110 at the bottom of the pod 104. Each mandrel may be configured to attach to a pipette tip, and each mandrel may have an elongate channel (not shown) that spans the vertical length of the mandrel. This elongate channel may allow each mandrel to facilitate the performance of pipetting operations on an attached pipette head. For example, the elongate channel may be used to create varying degrees of pressure within an attached pipette tip, allowing for liquid to be sucked into, or expelled from, the bottom of that pipette tip.

In some embodiments, the pod 104 may include one or more grippers 112. The grippers 112 may be used to carry objects or reposition them relative to the pod 104. For example, in some embodiments the grippers 112 may be used on a tip tray 106 in order to ensure that the tops of the pipette tips in the tip tray 106 are aligned with each of the mandrels 110. In some embodiments, the grippers 112 may be used to grasp onto a tip tray 106 to allow re-positioning of the tip tray 106, such as placing the tip tray 106 on top of an external tip loading station 108 for the loading of pipette tips onto the pod 104.

In some embodiments, the pod 104 may include a head 114 at the bottom of the pod 104. In some of such embodiments, the mandrels 110 may reside on the head 114.

FIG. 1C shows an example embodiments of the mandrels 110. As shown in the figure, the mandrels 110 are in a 8×12 configuration, for a total of 96 mandrels. Thus, the mandrels 110 can be simultaneously attached to 96 pipette tips. In some embodiments, each mandrel may be generally cylindrical with an elongate channel that spans the vertical length of the mandrel. This elongate channel may allow each mandrel to facilitate the performance of pipetting operations on an attached pipette head. For example, the elongate channel may be used to create varying degrees of pressure within an attached pipette tip, allowing for liquid to be sucked into, or expelled from, the bottom of that pipette tip. In some embodiments, each mandrel may be tapered towards the bottom end or have features at the bottom end that facilitate an air-tight friction fit with the top of a corresponding pipette tip.

Figure 1D:
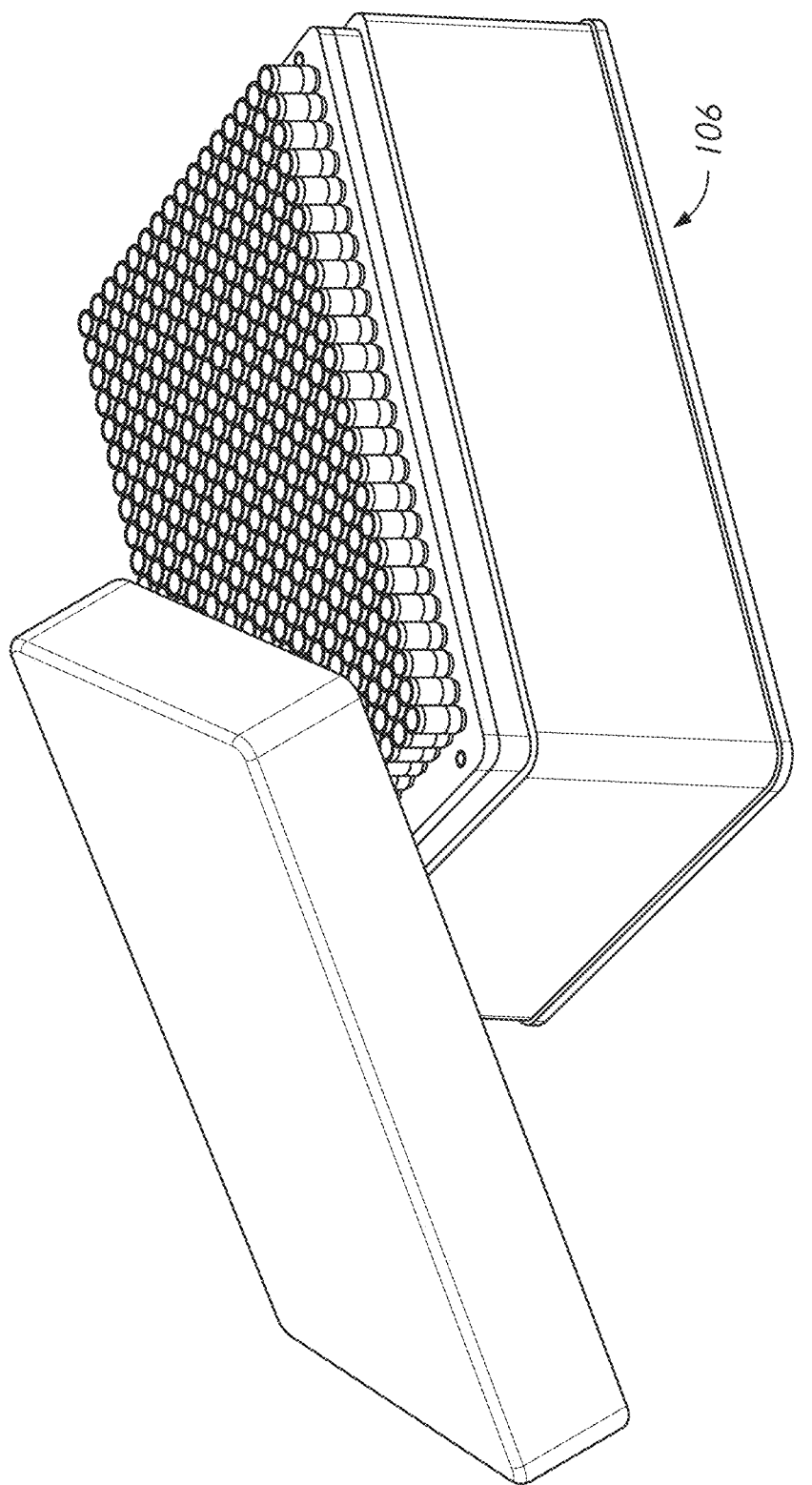
FIG. 1D shows a perspective view of example embodiments of a pipette tip tray.

FIG. 1D shows an example embodiment of a tip tray 106. As shown in the figure, the pipette tips are held upright in the tip tray 106 in a 16×24 configuration, for a total of 384 pipette tips. These pipette tips would be used with a corresponding set of mandrels 110 having the same 16×24 configuration to allow pipetting operations to be performed with up to 384 pipette tips. As previously mentioned, in order to load as many as 384 pipette tips onto the mandrels 110, a large amount of force may be required—as much as 500 or more lbs of force.

This required force can be generated through the use of an external tip loading station, such as the external tip loading station 108 shown in FIG. 1A, which pushes the pipette tips upwards to be seated onto the mandrels 110 of the pod 104. Thus, the external tip loading station 108 may generate and provide a substantial amount of force in the vertical axis.

However, in some embodiments, it may be desirable for the lab automation workstation to do without the external tip loading station 108. Depending on the exact method of operation of an external tip loading station 108, it may take up a large among of available deck space. Furthermore, the use of an external tip loading station 108 may require that the pod 104 be re-positioned over the external tip loading station 108 in order to load the pipette tips—greatly limiting where the pipette tips may be loaded. This increases processing times for any workflow performed by the lab automation workstation 100, as time is repeatedly spent on moving pipette tips to and from the external tip loading station 108 and re-positioning the pod 104 over the external tip loading station 108 in order to perform tip loading.

Integrated Drive System

In some embodiments, it may be desirable to combine the functionalities of the external tip loading station 108 and the pod 104. More specifically, it is desirable to add the force-providing functionality of the external tip loading station 108 to the pod 104 and remove the need for the external tip loading station 108 altogether.

In particular, integrating the tip-loading functionality into the pod 104 would allow pipette tips to be loaded anywhere on the deck of the workstation. This would result in less shuffling of labware during the workflow (e.g., needing to move a full tip tray on top of an external tip loading station any time tip loading is to be performed), which improves the efficiency of the workflow and reduces the total operating time. Furthermore, integrating the tip-loading functionality into the pod 104 also improves the flexibility of the workspace by freeing up additional space within the lab automation workstation for labware or other equipment that can be used.

However, there may be various challenges associated with integrating the tip-loading functionality into the pod 104. As previously mentioned, one such challenge is that simultaneously loading the pipette tips from a full tip tray 106 onto the pod 104 may require a large amount of force. Without an external tip loading station 108, this force has to be provided by the pod 104 itself. In embodiments for which the pod 104 does not have its own tip-loading capability, the pod 104 may be mainly configured to contain the components necessary to aspirate small quantities of fluid. The addition of the tip-loading capability to the pod 104, which may require the pod 104 to generate downward force in excess of 500 lbs needed for tip-loading, means that numerous additional components have to be added to the pod 104.

In some embodiments, the addition of extra components to the pod 104 may not be an issue and the dimensions of the pod 104 may be expanded in order to accommodate the extra components for generating the required tip-loading force. However, in other embodiments, the dimensions of the pod 104 may be constrained for some reason. For example, the height of the elongate pod 104 may be constrained. A taller pod 104 may be undesirable for both aesthetic and functional purposes, as it limits the spaces that the lab automation workstation 100 may fit in.

One way to address the space issue is to reduce the force that is required for tip-loading. A reduction in the required tip-loading force results in smaller vertical loads and moments produced on the components of the pod 104, allowing for smaller components to be used within the pod 104 that can still withstand those vertical loads. This would allow a pod with tip-loading capability to retain similar dimensions, or even the same pre-defined dimensional footprint, as a pod without tip-loading capability. The maximum tip-loading force needed depends on the insertion force required to seat each pipette tip onto a mandrel of the pod 104. There are four primary ways of reducing this insertion force: (1) using overshot/co-molded pipette tips; (2) using thin-wall pipette tips; (3) using mandrels with an o-ring or made of elastomer; and (4) optimizing mandrel geometry and material.

However, these methods of reducing the required tip-loading force may not always be feasible. For instance, relying on overshot/co-molded pipette tips requires the use of special pipette tips which may not always be available and are likely to be more costly than more standard pipette tips. O-ring mandrels may be sensitive to tolerance stack-ups and require frequent replacement of the o-rings; passive elastomer mandrels may similarly require frequent maintenance. Finally, optimizing mandrel geometries and masteries may not reduce the insertion force enough to serve as a single solution towards reducing the tip-loading force needed. Several of these alternative methods for reducing the required tip-loading force are also likely to affect the positional repeatability of loading the tips.

Thus, since it is difficult to reduce the required tip-loading force, a better solution for dealing with the space issue may instead be to add the extra force-generating components to the pod 104 without having to significantly expand the dimensions of the pod 104 (while keeping in mind that the components themselves cannot be downsized since the tip-loading force cannot be reliably reduced). In some embodiments, the components for generating the tip-loading force within the pod 104 may be collectively referred to as the drive system.

One way to add a drive system to the pod 104 without having to significantly increase the dimensions of the pod 104 is through the use of lead screws or ball screws. This disclosure makes reference to lead screws for ease and simplicity, but any suitable alternatives for providing precise linear motion (to a mounting plate, as described in FIG. 2) are contemplated, including ball screws, pistons, linear actuators, and so forth.

In some embodiments, the pod 104 may have one or more "drive elements", such as a first drive element or a second drive element. A drive element may be any device or component capable of providing precise linear motion, including lead screws, ball screws, pistons, linear actuators, just to give a few examples.

In some embodiments, the pod 104 may have a drive system that includes one or more lead screws that span the vertical axis of the pod 104. The lead screws could be driven by one or more motors in order to push the mandrels down onto the pipette tips with the necessary force needed for tip-loading.

For example, in some embodiments the pod 104 may have a single lead screw that spans the vertical axis of the pod 104. In some of such embodiments, the single lead screw may be located in the center of both the X-axis and Y-axis of the pod 104. In other words, the lead screw may run from the top of the pod 104 towards the bottom of the pod 104 through the center of the pod 104, and it may provide a symmetrical load. In some of such embodiments, this lead screw may be able to provide upwards of 500 lbs of force.

This example demonstrates a centered drive system that is located vertically over the geometric center of the pod 104, which minimizes the moments that are generated within the pod 104. However, in this example, the pod 104 also contains the components to perform the various pipetting operations through the mandrels 110 at the bottom of the pod 104. These components may include pumps for each of the mandrels, which run down the center of the pod 104 since the mandrels 110 are also centered at the bottom of the pod 104. These pumps may also be referred to as "plungers" or "pistons". Thus, for a pod 104 configured with pipetting hardware for a set of 384 mandrels, they may be as many as 384 separate pumps. Thus, in order for a single lead screw to run down the center of the pod 104, it would have to go through the center of those pumps which is possible, but difficult to accommodate without increasing the dimensions of the pod 104.

In other alternative embodiments, the pod 104 may instead have a single lead screw that is off-center or runs along one of the sides of the pod 104. Such an offset drive system may allow for a more vertically-compact pod 104 than a centered drive system, with the lead screw still being able to provide upwards of 500 lbs of force. However, using an offset drive system, there would be a cantilevered load that is not symmetrical. In other words, with an offset drive system, the ability to apply a force at the geometric center of the entire pod 104 while maintaining horizontal stability of the interface plane (where the pod 104 connects to the pipette tips) becomes difficult. If the system is not rigid enough, the load applied to the pipette tips will have a gradient across the tip tray 106, with the end effect of unevenly loaded pipette tips (e.g., some pipette tips will be seated more securely, or further onto the mandrels, than others). This can be an issue because an air-tight connection with each of the pipette tips is desired. Furthermore, it is also very important for tips to be loaded to the same consistent height. If they are not, which could occur with an offset drive system, some of the tips will reach the bottom of the pipette well while others do not. This may impact the capability for performing low-volume pipetting operations and the overall coefficient of variation for pipetting because some of the tips (e.g., the tips that do not reach the bottom of the pipette well) could end up sucking up air bubbles instead of the desired reagent. In order to counteract the moments applied to the system, the pod 104 and its components are strengthened to be able to resist rocking about the load center. Increasing the size of all of the linear motion components within the pod 104 to resist the bending moments would allow for offset loads while still maintaining the orientation of the interface plate. The resulting pod that is used with an offset drive system ends up becoming much larger in both the X-axis and Y-axis, as well as being heavier, than a comparable pod with a centered drive system capable of delivering the same loading force. In the scenario where the pod 104 is constrained to a pre-defined dimensional footprint, it may be possible but difficult to fit the upsized, strengthened components within the pod 104 in order to accommodate the offset drive system.

Thus, it is possible but may be difficult to use a single lead screw in the pod 104 without increasing the dimensions of the pod 104, regardless of whether a centered or offset drive system is used. In other embodiments, two or more lead screws may be simultaneously used in order to provide the required tip-loading force at a geometric center of the entire pod 104 without needing any lead screws to run through the center of the pod 104. Thus, any number of lead screws of two or more can be used. For example, four lead screws could be used, with a lead screw on each side of the pod 104 or at each corner of the pod 104. The use of additional lead screws may be beneficial for load-matching purposes, as disclosed later in this application. However, it should be noted that the use of too many lead screws may take up additional space within the pod 104 and require a larger pod 104 to accommodate those lead screws. The following example embodiments depicted in the figures utilized two lead screws, a configuration which is intended to be non-limiting and provided merely for the purposes of facilitating understanding of the operation of the drive system.

With regards to the figures, FIGS. 2-5 are directed towards example embodiments of a pod utilizing two lead screws, with each lead screw located on an opposing side of the pod and running parallel to the Z-axis of the pod. Both lead screws may be configured to deliver force used in tip-loading by pushing downwards on both sides, which allows for the added benefit of the load being evenly split between the two lead screws when the load is centered between the two lead screws.

Figure 2:
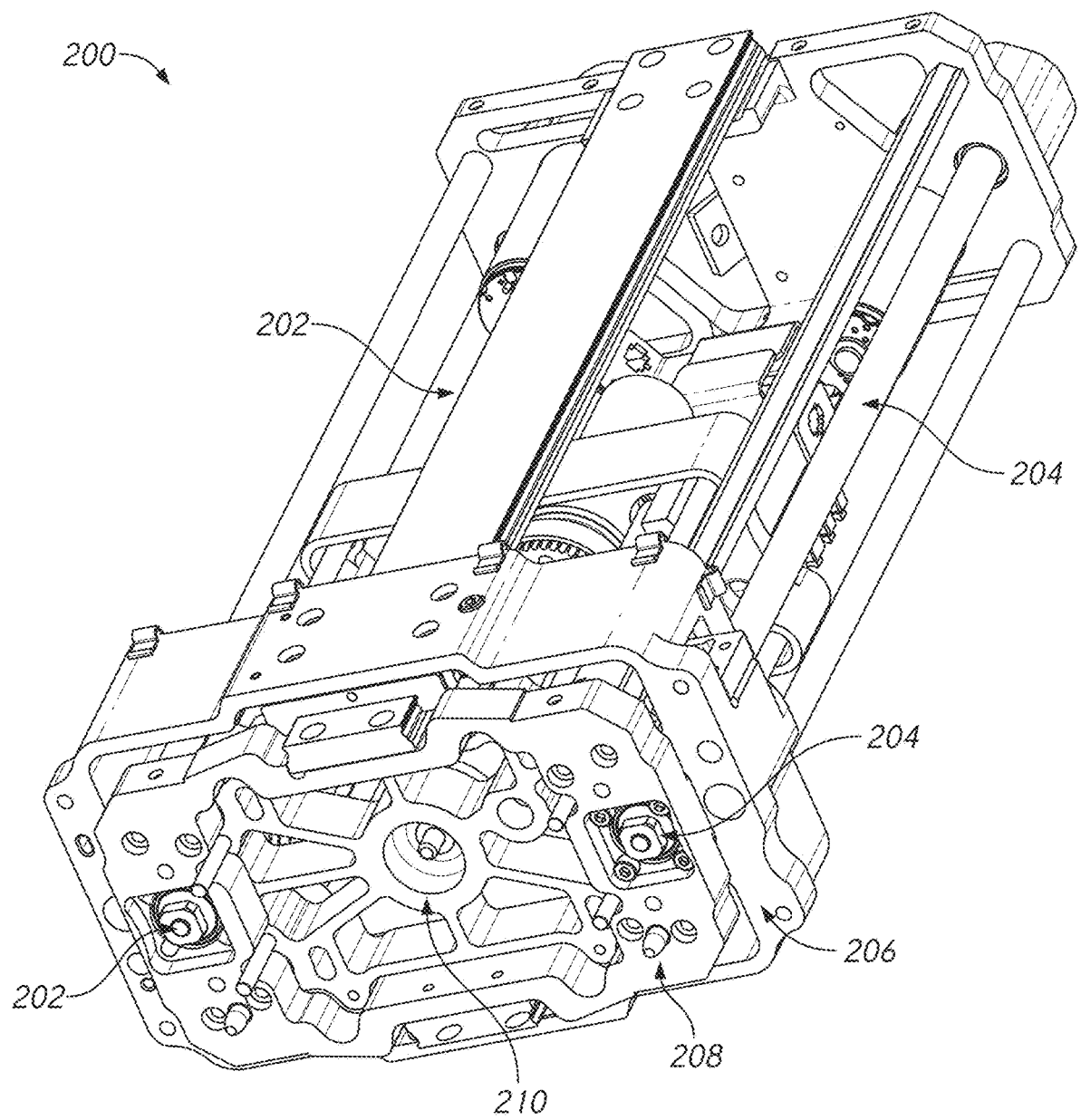
FIG. 2 shows a bottom perspective view of the internal components of a pod used in example embodiments of a lab automation workstation.

FIG. 2 shows a bottom perspective view of the internals of a pod utilizing two lead screws according to one example embodiment.

More specifically, the pod 200 may include a first lead screw 202 and a second lead screw 204 that span the vertical axis of the pod 200 and are on opposing sides of the pod 200. At the bottom end of the pod 200 is a mounting plate 206, an interface plate 208, and a center piece 210 which carries the mandrels. Accordingly, the center piece 210 interfaces with the pumps (and other components for pipetting operations) held in the center of the pod 200, with the resulting pipetting operations taking place at the bottom of the pod 200 at the center piece 210.

As shown in the figure, in some embodiments, both the first lead screw 202 and the second lead screw 204 may be anchored to the top and the bottom of the pod 200. In some embodiments, the first lead screw 202 and the second lead screw 204 run through the mounting plate 206, as well as the interface plate 208. The bottom ends of the first lead screw 202 and the second lead screw 204 may be affixed to the interface plate 208; as seen in the figure, the first lead screw 202 terminates at the bottom end of the pod 200 and the second lead screw 204 terminates at the bottom end of the pod 200. The lengths of the lead screws may be of any suitable lengths. In some embodiments, the lead screws can be about as long as the vertical length of the pod 200.

In some embodiments, the mounting plate 206 and the center piece 210 may move up and down relative to the lead screws, while the interface plate 208 remains anchored to the bottom ends of the lead screws. In some of such embodiments, the mounting plate 206 and the center piece 210 may move up and down relative to the lead screws as a result of the lead screws being turned clockwise or counterclockwise. In some embodiments, the interface plate 208 is part of the drive system and helps supply the necessary tip-loading force. As the interface plate 208 is positioned over tray of pipette tips, the turning of the lead screws may result in the mounting plate 206 and the center piece 210 (containing the mandrels) to be driven downwards towards the pipette tips. As the mandrels are pushed downwards with the necessary tip-loading force, the mandrels become attached to the pipette tips via friction fit.

Figure 3:
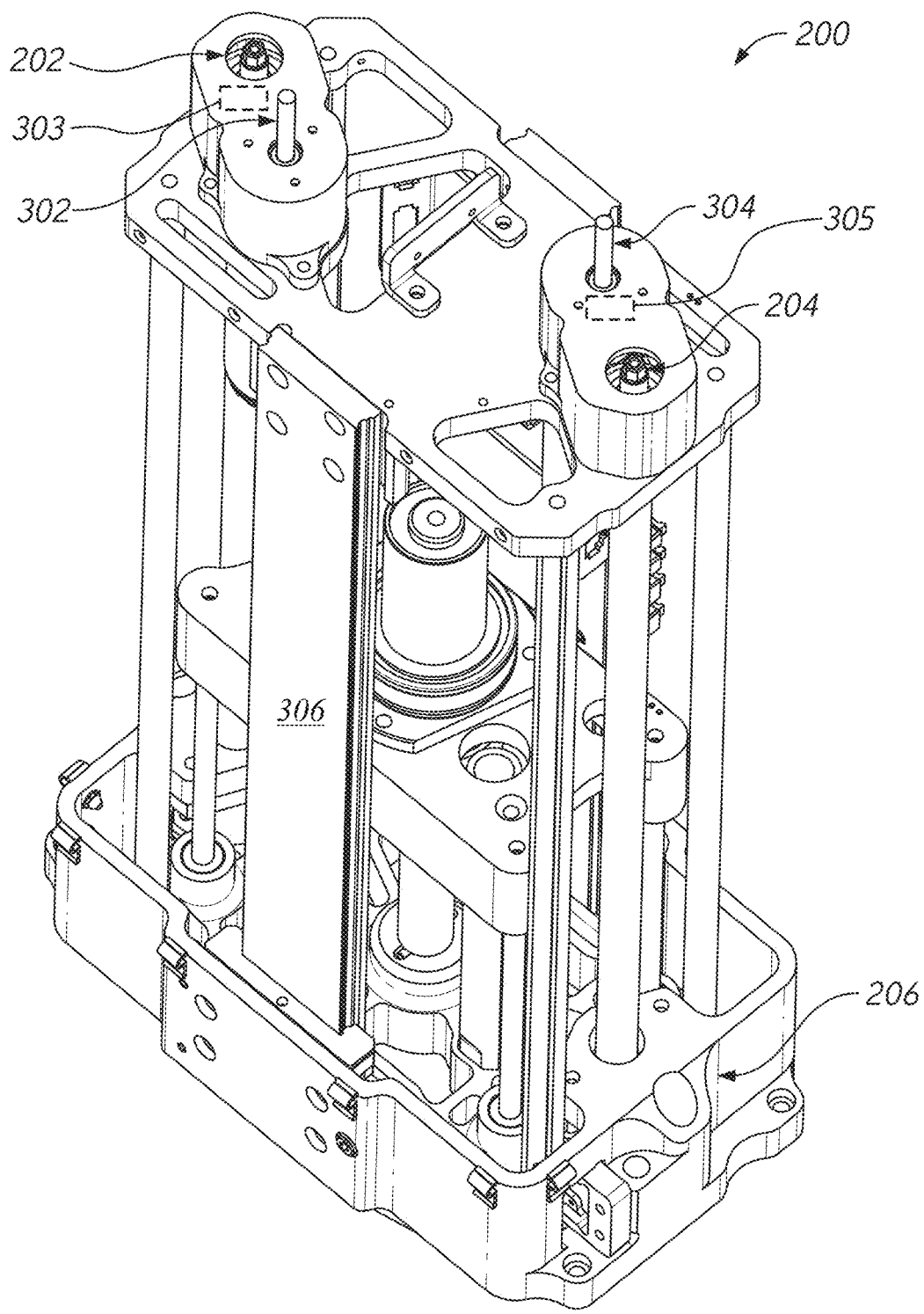
FIG. 3 shows a top perspective view of the internal components of a pod used in example embodiments of a lab automation workstation.

FIG. 3 shows a top perspective view of the internals of a pod utilizing two lead screws according to one example embodiment.

More specifically, FIG. 3 illustrates how the lead screws, such as the first lead screw 202 and the second lead screw 204, may be turned in various embodiments of the pod 200. It is contemplated that any method and configuration may be used for turning the lead screws, and not only through the use of motors mechanically coupled to the lead screws. Furthermore, there may be any number of motors that are mechanically coupled to any number of lead screws.

As shown in the figure, each individual lead screw is mechanically coupled to an independent motor. For instance, the top of the first lead screw 202 may be mechanically coupled to a first motor 302. In some embodiments, the first motor 302 may be within an enclosure and mechanically coupled to the first lead screw 202 by a pulley and belt, both of which may also be housed within the enclosure. The operation of the first motor 302 may be used to turn the first lead screw 202 clockwise and counter-clockwise. The top of the second lead screw 204 may be mechanically coupled to a second motor 304. In some embodiments, the second motor 304 may also be within an enclosure and mechanically coupled to the second lead screw 204 by a pulley and belt, both of which may also be housed within that enclosure. The operation of the second motor 304 may be used to turn the second lead screw 204 clockwise and counter-clockwise. As in the previous figure, both lead screws may span the vertical dimensions of the pod 200 and may be anchored at both the top of the pod 200 and the bottom of the pod 200.

Thus, in various embodiments, each lead screw used in the drive system may be mechanically coupled to an independent motor that drives it. This configuration may also provide numerous advantages towards allowing for the loading of a partial rack of pipette tips, as opposed to the loading of all the pipette tips in a tip tray. In a typical scenario where a full tip tray is loaded, a symmetrical downward force can used. For instance, the workstation may re-position the bottom of the pod to be centered over the full tip tray. During tip-loading, a reaction force is produced in the Z-axis that is centered at both the X-axis and Y-axis of the bottom of the pod 104. Thus, any drive system capable of delivering a symmetrical downward tip-loading force can be used to pick up all of the pipette tips in the tray because the downward tip-loading force will be aligned with the reaction force.

However, when it comes to the partial loading of pipette tips, where only some of the pipette tips in the tip tray are loaded rather than the entire tray, the bottom of the pod may not be perfectly centered over the tip tray or the array of tips remaining in the tip tray. For example, in order to load pipette tips on the right side of the tip tray, those pipette tips may be aligned with the left side of the bottom of the pod. This would allow for the pod to pick up only those pipette tips on the right side of the tip tray and not any of the other pipette tips in the tray (e.g., the pipette tips on the left side of the tip tray). In this scenario, the reaction force produced by the tip tray would not be centered on the bottom of the pod, but rather positioned towards the left side of the bottom of the pod. In general, during a partial load of the tip tray, the total reaction force may be decreased but may be moved off-center in one or more of the X-axis and Y-axis of the pod. In other words, the reaction force could be produced towards a side or corner of the bottom of the pod, rather than at the center.

This creates an offset load (an uneven load on the pod), which makes it difficult to apply the right amount of tip-loading force to the pipette tips or to keep the pod parallel to the array of tips. If not enough force is being applied to those specific pipette tips, or if the pod does not remain parallel to the array of tips, the pipette tips may attach to the mandrels but may not be seated well on the mandrels. The connection may leak air and those pipette tips will not handle pipetting operatoins well. If too much force is being applied to those specific pipette tips, the pipette tips may be crushed.

As will be described later in this application in regards to FIG. 5, indepedently driving the lead screws can be used to deal with this problem, so that the pod 200 can be used to load a full tray of pipette tips, a partial tray of pipette tips, or even a single pipette tip. The pod 200 may have one or more rails or guides, such as rail 306 (there may be a corresponding rail on the other side of pod 200 that is not viewable in FIG. 3), that guides the movement of the mounting plate 206 and prevents the mounting plate 206 from tilting too much—as may be the case if the independently-driven lead screws turn out of sync or if one of the lead screws is turned too much. If the mounting plate 206 tilts too much, the pod 200 may jam and further movement of the mounting plate 206 may not be possible. Thus, the rails or guides may hold the mounting plate 206 level. Furthermore, the control exerted over the motors may also ensure that the lead screws are not turning out of line with each other, which may cause the mounting plate 206 to tilt.

FIG. 4A shows a side perspective view of the internals of a pod utilizing two lead screws according to one example embodiment.

FIG. 4B shows a top-down view of the internals of a pod utilizing two lead screws according to one example embodiment.

With regards to both FIG. 4A and FIG. 4B, many previously-described components of the pod can be seen in relation to each other.

For example, the first lead screw 202 (e.g., an example of a first drive element) can be seen operatively and mechanically coupled to a first motor 302 via a timing pulley and belt 402 and anchored at the top of the pod. The first lead screw 202 also runs through the mounting plate 206 and is anchored at the bottom of the pod at the interface plate 208. Similarly, the second lead screw 204 (e.g., an example of a second drive element) can be seen operatively and mechanically coupled to a second motor 304 via a timing pulley and belt 404 and anchored at the top of the pod. The second lead screw 204 also runs through the mounting plate 206 and is anchored at the bottom of the pod at the interface plate 208. In some embodiments, there may be a first force sensor 303 configured to detect a first force coming from the first drive element. In some embodiments, the first force sensor 303 may be a component of the first motor 302. In some embodiments, the first force sensor 303 may include a winding of the first motor 302. In some embodiments, there may be a second force sensor 305 configured to detect a second force coming from the second drive element. In some embodiments, the second force sensor 305 may be a component of the second motor 304. In some embodiments, the second force sensor 305 may include a winding of the second motor 304.

The mounting plate 206 (e.g., an example of a platform or a pipettor head) moves up and down along the first lead screw 202 and the second lead screw 204, as well as the rails 306 and 308 which help prevent the mounting plate 206 from tilting as it moves up and down. In some embodiments, the mounting plate 206 or platform may include a first location. In some embodiments, the mounting plate 206 or platform may be configured to engage the first drive element and the second drive element, and the activation of the first drive element and the second drive element may displace the mounting plate 206 or platform. In some embodiments, this first location on the mounting plate 206 or platform may be offset from the first drive element and from the second drive element. In some embodiments, the mounting plate 206 or platform may further include a second location offset from the first drive element, from the second drive element, and from the first location. In some embodiments, the mounting plate 206 or platform may be subdivided into a first area and a diagonally opposed second area by a centerline and a midline. The centerline may intersect the centers of the first drive element and the second drive element and the midline perpendicular to the centerline through the midpoint of the centerline. In certain embodiments, the first location of the platform is disposed in the first area and the second location of the platform is disposed in the second area.

In some embodiments, the mounting plate 206 or pipettor head may be engaged to a first drive screw and a second drive screw (such as the first lead screw 202 and the second lead screw 204). The pipettor head may be disposed above a deck (such as the center piece 210 shown in FIG. 2 or the mandrels 110) may move up and down relative to the lead screws, while the interface plate 208 remains anchored to the bottom ends of the lead screws. In some of such embodiments, the mounting plate 206 may be movable with respect to the deck in response to a torque applied to the first drive screw and a torque applied to the second drive screw. When a plurality of pipette tips is present, the plurality of pipette tips may produce an insertion force on the pipettor head. In some embodiments, the deck may be configured to support a plurality of pipette tips. In some embodiments, there may be a first force sensor 303 coupled to the first drive screw and configured to detect a first value of the insertion force produced by the plurality of the pipette tips. For example, the first force sensor 303 could be a winding in the first motor that is operatively coupled to the first drive screw. In some embodiments, there may be a second force sensor 305 coupled to the second drive screw and configured to detect a second value of the insertion force produced by the plurality of the pipette tips. For example, the second force sensor 305 could be a winding in the second motor that is operatively coupled to the second drive screw.

In some embodiments, there may be a controller (for example, the central controller 700 shown in FIG. 7) configured to adjust the torque of the first drive screw in response to the detected first value of the insertion force detected by the first force sensor 303. The controller may also be configured to adjust the torque of the second drive screw in response to the detected second value of the insertion force detected by the second force sensor 305. In some embodiments, the controller may be configured to apply a torque to the first drive screw to produce a predetermined first value of the insertion force to be detected by the first force sensor 303.

In some embodiments, there may be a first encoder strip 412 (e.g., an example of a first linear encoder) that runs parallel along the length of the first lead screw 202. In some embodiments, there may also be a second encoder strip 414 (e.g., an example of a second linear encoder) that runs along the length of the second lead screw 204. In some embodiments, there may be a first encoder head 422 (e.g., an example of a first position sensor) on the mounting plate 206 (e.g., at the first location of the platform) and a second encoder head 424 (e.g., an example of a second position sensor) on the mounting plate 206 (e.g., at the second location of the platform). The encoder strips and the encoder heads can be used to measure the position of the mounting plate 206 along the lead screws. This information can be used for feedback purposes in controlling the motors, which were previously mentioned to be independently driven. In some embodiments, a first position sensor may be configured to measure a first position of the platform at the first location. In some embodiments, a second position sensor may be configured to measure a second position of the platform at the second location. In some embodiments, the first position sensor may include a first linear encoder adjacent the first location. In some embodiments, the second position sensor may include a second linear encoder adjacent the second location. As will be described in regards to FIG. 5, independently driving the motors and the lead screws, as well as collecting feedback information useful towards controlling those independently driven motors, can allow for the pod to perform partial loading of pipette tips from a tray while dealing with offset loads.

In some embodiments, there may be a first encoder strip 412 (e.g., a first linear encoder) and a second encoder strip 414 (e.g., a second linear encoder). The second linear encoder may be offset from the first linear encoder. The first linear encoder may configured to measure a first position of the mounting plate 206 (e.g., pipettor head) and the second linear encoder may be configured to measure a second position of the pipettor head. In some embodiments, the controller (such as the central controller 700 shown in FIG. 7) may be configured to adjust the torque of the second drive screw in response to the first position and the second position of the pipettor head measured by the first and second linear incoders. In some embodiments, the controller may be configured to apply a torque to the second drive screw to produce a predetermined second value of the insertion force to maintain the measured second position level with the measured first position. In some embodiments, the controller may be configured to apply a torque to the second drive screw to produce a predetermined second value of the insertion force. In some embodiments, the two offset encoder strips (first encoder strip 412 and second encoder strip 414) may be useful for maintaining the levelness of the pod relative to the array of tips when the pod is pushing against an offset force created by a partial array of tips in the tip tray.

As previously mentioned, in some embodiments the mounting plate 206 or pipettor head may be subdivided into a first area and a diagonally opposed second area by a centerline and a midline. The centerline may intersect the centers of the first drive screw and the second drive screw and the midline perpendicular to the centerline through the midpoint of the centerline. The first position may be measured using a first position sensor in the first area and the second position may be measured using a second position sensor in the second area. In some embodiments, the pipettor head may include a plurality of mandrels each configured to engage a pipette tip. In some cases, when the plurality of mandrels engage the plurality of pipette tips, fewer than all of the plurality of mandrels are engaged. This advantageously allows flexible use of the pipettor head for a limited set of liquid transfers while conserving pipette tips.

Figure 5:
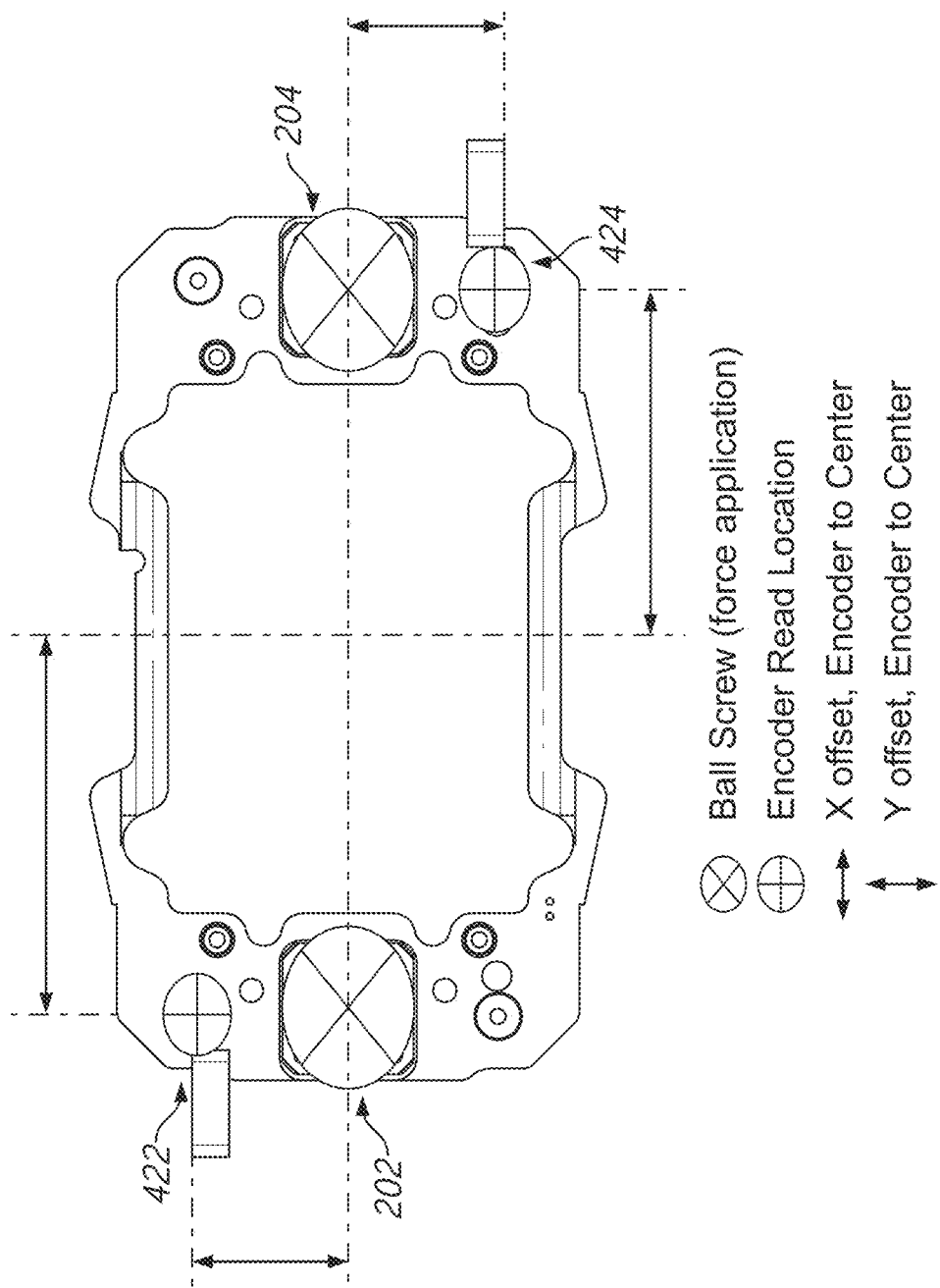
FIG. 5 shows a top-down view of an interface plate used in example embodiments of a lab automation workstation.

FIG. 5 shows a top-down view of the interface plate. More specifically, FIG. 5 shows the positionings of various components in relation to the center of the interface plate.

As previously mentioned, the use of multiple lead screws, such as lead screws 202 and 204, can allow for the partial loading of pipette tips. In other words, in a tip tray containing 384 pipette tips, the lab automation workstation may be able to control the pod to pick up only a subset of those pipette tips (e.g., any number from one tip to the full amount of 384 tips).

In general, the pod may be able to only pick up a certain arrangement of tips from the tray at one time. This may typically involve using a region of the mandrels that opposes the region of the tip tray that the tips are being picked up from. For example, in order to pick up the rightmost column of tips in a full tip tray, the left side of the mandrels would be lowered onto those tips. To pick up the topmost row of tips in a full tip tray, the bottom side of the mandrels would be lowered onto those tips. To pick up tips off the top right corner of the tray, the bottom left corner of the mandrels could be lowered onto those tips.

More complex arrangements of tips may be picked up through a combination of multiple tip-loading procedures. For example, an "L" shaped arrangement of tips that includes the leftmost column and bottommost row of tips could be picked up using a combination of two tip-loading procedures. In some embodiments, the lab automation workstation can have an imager, camera, or sensor to detect and determine the positions of available tips held in the tip tray. In some of such embodiments, the imager, camera, or sensor may be integrated with the pod. In some embodiments, the control software for the lab automation workstation may be able to automatically determine the necessary combination of tip-loading procedures to pick up a certain arrangement of pipette tips and then automatically perform that combination of tip-loading procedures.

As previously described, in these examples that involve the partial loading of pipette tips, since the pod is not being centered directly over the tip tray (as would be the case with a full loading of tips) there is an uneven load on the pod. In other words, the reaction force associated with only loading the rightmost column of tips in a tip tray holding 384 tips would be offset from the center. However, the magnitude, location, and distribution of that uneven load can be determined. In some embodiments, the magnitude, location, and distribution of that uneven load can be mathematically modelled and known in advance. For example, just by knowing that only the rightmost column of tips is to be loaded onto the mandrels, the magnitude and distribution of the load can be determined.

Since the screws are being driven using independent motors, more force can be supplied through one lead screw than the other by adjusting the torque provided by each of the motors. The lead screw convers the rotary motor torque into a force applied to the pod. Different, but precise, amounts of force can be delivered through each lead screw in a manner that counteracts the uneven load on the pod, so that the downward tip-loading force being applied matches the load while the mandrels are kept level. The end result is that the pod (and the mandrels) can be kept level with the right amount of tip-loading force being delivered to the pipette tips. Otherwise, if the mandrels are not kept level, the pods will pick up tips at an angle and have the possibility of jamming. Or if the force is too low, the pipette tips may not seat well on the mandrels and will leak air, or the pipette tips may be loaded to inconsistent heights relative to the mandrels. Or if the force is too high, the pipette tips will be crushed by the force.

As previously mentioned, this concept could be extended to multiple drives for the Z-Axis (e.g., a third lead screw). Adding a third drive, for example, could help to normalize forces about an additional axis (e.g., the X axis in addition to the Y axis). Thus, in some embodiments, the pod may utilize three lead screws with each lead screw mechanically coupled to an independent motor. For example, the three lead screws may be positioned in a triangular configuration and span the vertical axis of the pod as opposed to the figures shown, in which two lead screws are on opposing sides of the pod.

However, in order to be able to adjust the force provided by the lead screws to counteract the uneven load while keeping the mandrels level, the lab automation workstation must be able to determine the force being provided by each lead screw, as well as determine whether the mandrels are being kept level (or if they are tilted, and the degree of tilt). Various methods and embodiments for determining the forces provided by the lead screws and whether the mandrels are level are described below.

In some embodiments, the lab automation workstation may be able to measure the force provided by the lead screws by measuring the currents in the motors that are coupled to the lead screws. Those currents may be correlated to a force through a mathematical model of the drive system.

In order to determine whether the mandrels are being kept at the same height, a good proxy is to determine whether the mounting plate is being kept level since the mandrels will move higher or lower along with the mounting plate. In some embodiments, the lab automation workstation may be able to determine the corner positions of the mounting plate along the vertical axis, which can be used to determine whether the mounting plate has a tilt in either the X or Y planes. In some of such embodiments, the lab automation workstation may have linear encoder strips that run alongside the lead screws. These strips may include magnetic domains or optical markings or other detectable properties that vary along the length of each linear encoder strip. The mounting plate may have encoder heads that correspond to the encoder strips running alongside the lead screws, such that the lab automation workstation can determine how far along the lead screw the corner positions (where the encoder heads are) of the mounting plate are. By measuring the tilt of the mounting plate, if the lab automation workstation senses a tilt in the mounting plate occurring despite knowing the load distribution in advance, the lab automation workstation can infer that one of the lead screws is delivering too much force and can adjust the motors in response.

With reference to the figures, the linear encoder magnetic strips may be encoder strips 412 and 414 as seen in FIG. 4A that run alongside the lead screws. However, the encoder strips, as well as the encoder heads (such as encoder heads 422 and 424 as seen in FIG. 4B) on the mounting plate that correspond to them, may not necessarily be on the lead screws themselves but may instead be offset from them. The offset can be better seen in FIG. 5. Relative to the center of the interface plate, the encoder head 422 (and the corresponding encoder strip 412) has both a X offset and a Y offset from the center of the interface plate. Similarly, the encoder head 424 (and the corresponding encoder strip 412) also has both a X offset and a Y offset from the center of the interface plate. With two linear encoders situated on opposite corners (front right and rear left) the mandrels can be kept level and both motors can be kept in sync.

By positioning both encoder heads with X and Y offsets on opposing sides of the interface plate, only two encoder heads are needed to determine the tilt of the mounting plate in both the X and Y planes. This is an improvement over having both encoder heads on the same Y coordinate, which would result in potential tilt of the mandrels about the X axis without a means of detection.

In contrast, if a single encoder were used, it may be difficult to properly sync the motors and the ability to dynamically level the pod would not exist, as it would not be possible to know how level the mandrels are. It would be possible for one motor to drive harder and faster than the other and induce excessive wear and binding situations, causing the pod to jam.

Figure 6A:
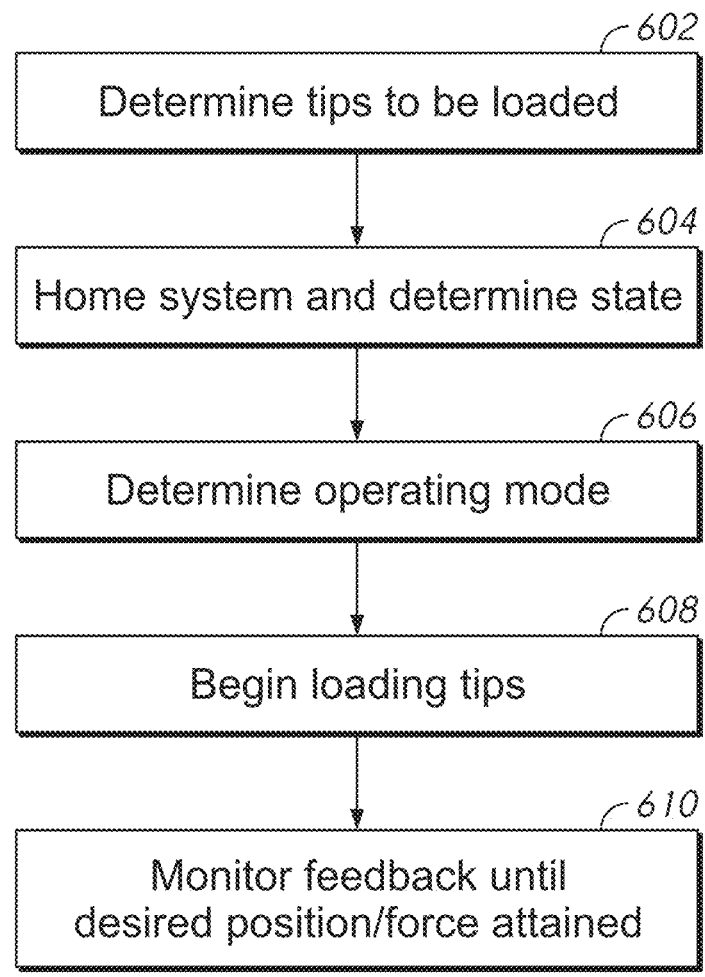
FIG. 6A shows a flowchart depicting the loading of a partial set, or selective quantity, of tips in accordance with example embodiments of a lab automation workstation.

FIG. 6A shows a flowchart depicting the loading of a partial set of tips in accordance with example embodiments of a lab automation workstation.

In the previous figures, embodiments of a pod with integrated tip-loading functionality was shown utilizing two lead screws (e.g., a dual drive in the Z-axis). This dual drive Z-axis setup was described as utilizing two feedback systems—one regarding the force being delivered through the screws and one regarding the tilt of the mounting plate. In some embodiments, the dual drive Z-axis setup may utilize these two feedback systems which operate independently, but exist within a single microprocessor. Both feedback systems are started or stopped simultaneously and managed by a common motion system which synchronize the status of each motor. This abstracts the dual drive system in a manner such that the instrument software treats the dual drive as a single motor. For example, if one of the dual motors encounters a problem which results in the motor stopping, the common motion system may automatically stop the other motor before reporting the error to the instrument software.

At block 602, the lab automation workstation may determine the tips to be loaded onto the mandrels of the pod. This may be in response to an input from a user, such as if the user makes a selection in the control software regarding which tips in the tip tray to be loaded. Thus, any number ranging from a single tip to all of the tips in the tray may be selected to be loaded. In some embodiments, the lab automation workstation may include an imager, camera, or sensor that can detect which tips in the tip tray are available to be loaded.

As previously mentioned, in some scenarios the arrangement of tips to be loaded may be more complex and require multiple loadings to be performed. In such a scenario, the lab automation workstation may be able to automatically determine the necessary combination of loading procedures to be performed and execute them, which may involve performing blocks 604, 606, 608, and 610 multiple times—one for each loading procedure in the combination.

At block 604, the lab automation workstation may home the dual drive system and determine its state. Prior to the system being homed, the state of the dual drive system (e.g., the positions of the motors) are not known. For proper operation the motors must be homed to a known location such as a physical hard stop. In some embodiments, both motors are driven simultaneously in the direction of the hard stop with a limited force until that force limit is reached for a configured amount of time. Once the hard stops are found for each motor, their respective encoder positions are set to the home position. The time element is particularly important to prevent falsely finding the home location. In some embodiments, before starting the search for the hard stops, it may be necessary to ensure that the two motors are aligned enough to move without binding. This is accomplished by driving each motor in opposite directions, recording each position, then reversing the direction of each motor, again recording the positions, then moving each motor to the average of the found positions. The common motion system automatically manages this process as part of homing.

At block 606, the lab automation workstation may determine an operating mode to use for controlling the delivery of the tip-loading force depending on the tips to be loaded. In some embodiments, the lab automation workstation may be able to automatically determine the operating mode to use for the tips to be loaded without needing human input. Various operating modes are disclosed below:

One operating mode is a push move, in which the motors are driven until a desired output force is obtained. In applications such as loading a full tray of tips, an even force distribution is required to ensure all tips are loaded. Simply driving the mounting plate to a certain position may not be adequate since various factors such as levelness of the tip tray and flexing of the chassis or deck plates can cause uneven forces on each side of the tip tray. Driving each motor to a constant force allows both motors to move until a configured force is obtained for a defined amount of time. Force can be measured by a force gauge (transducers or strain gauges, for example) or by measuring current going to the motors. To perform a push move, both motors in the dual drive system are given a target force which is converted to a motor current value. Both motors are started simultaneously and follow their respective trajectories until the motor current limit is reached for the specified amount of time. When both motors reach the limit or the target position is reached, the push move is complete. When the mechanical components flex (the chassis or deck plates, for example) this has a compensatory effect that distributes the force more evenly over the surface of the tip tray. For the partial loading of tip trays, the force needed from each motor may be different. Various distributions of forces may be applicable. For example, the system may calculate the geometric center of the load based on a model of the force required for each tip and the geometric distribution of pipette tips with respect to the pod. The system may then project the calculate geometric center onto the centerline connecting the lead screws and calculate torques for each of the lead screws, where at least a portion of each torque is inversely related to the distance between the respective lead screw and the projected geometric center.

Another operating mode is a position-based feedback move, in which both motors are driven in a closed-loop fashion using the linear encoders for feedback until the motors are in a desired position. A typical position-based feedback move for a single motor utilizes a trajectory generator to set the desired position of the motor over time, an encoder to compare the actual position to the desired position, and a control loop to generate the control variable which is the input to the motor drive system. In the dual drive system, each motor has its own trajectory generator which plots a trajectory to the same target position. It is possible for the starting positions to be different if the two motors are not perfectly aligned at the start of a move. In some embodiments, there may be encoder feedback shared between motors, such that feedback from both encoders is utilized in a multi-input/multi-output (MIMO) PID control loop. The rationale is that one motor may get ahead of the other motor causing the dual drive pod to tilt, which further results in the binding of the linear guide components. Including encoder feedback from both motors in the control of each motor will detect the tilt and equalize the positions of the motors.

Another operating mode is a one-sided push move, in which one motor is driven until a desired output force for that motor is obtained, while the other motor is tracked using position. For example, if the pod is loading a column of tips on the left side and no other tips, the left motor will be programmed to move with a specific force. The target position of the right motor will be determined by the relative distance the left encoder has moved from its starting position. In other words, if the left motor reaches the target force after moving N encoder counts from its starting position, the target position of the right motor will be N encoder counts past the start position of the right motor.

Another operating mode is an asymmetric push move, in which a push move is performed but the motors are driven until two different desired output forces are obtained between the motors. This may be useful for the partial loading of tip trays, since the desired otuput forces are calculated to intentionally distribute the force unevenly. The distribution of the force will be based on the location and quantity of the tips being loaded.

At block 608, the lab automation workstation may begin loading tips by driving the lead screws in order to move the mounting plate downwards in order to attach the mandrels to the pipette tips, in accordance with the selected operating mode.

At block 610, the lab automation workstation may monitor the feedback systems until the desired positions or forces associated with the motors are attained.

Figure 6B:
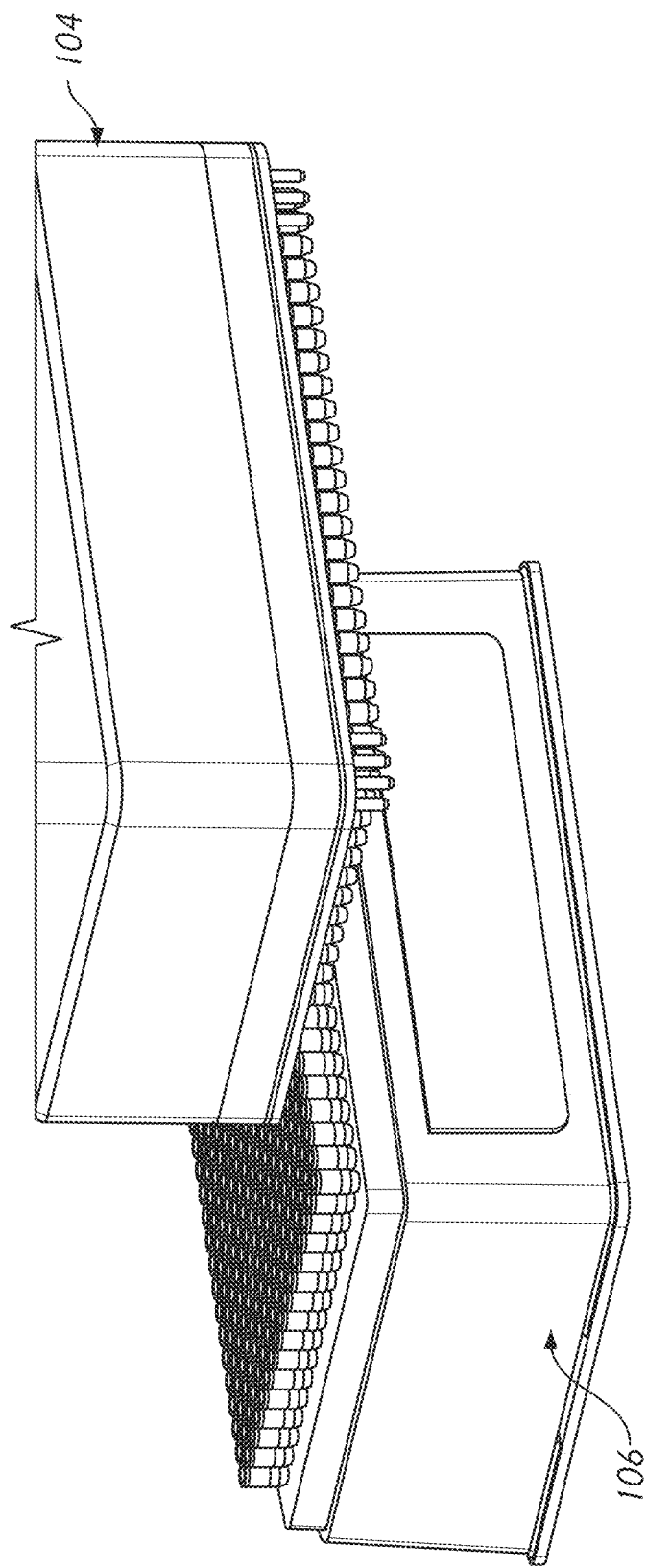
FIG. 6B shows a side perspective view of the loading of a partial set of tips in accordance with example embodiments of a lab automation workstation.

FIG. 6B shows a side perspective view of the loading of a partial set of tips in accordance with example embodiments of a lab automation workstation.

More specifically, the figure illustrates a pod 104 and a tip tray 106 containing 384 pipette tips in a 16×24 configuration. The pod 104 has been tasked with picking up 4 rows and 16 columns of pipette tips from the tip tray 106. Accordingly, the pod 104 is not positioned directly over the center of the tip tray 106. Instead, the pod 104 is positioned at an offset from the center, such that only the 4×16 array of tips is contacted by the pod 104 and picked up. The actual implementation of loading this partial set of tips from the tip tray 106 can be understood by referencing the above description associated with FIG. 6A.

Alternative Embodiments

In some embodiments, the pod may utilize an offset loading scheme with a single-sided drive system. For example, there could be a single lead screw off-center within the pod. The linear motion components may need to be increased in size in order to deal with the moments created by offset reaction forces.

In some embodiments, the pod may utilize a drive system that is centered within the pod, with zero or minimal offset of the Z-drive relative to the geometric center of the pod. For example, there could be a single lead screw centered within the pod. This may require the pod to have a greater vertical height to avoid conflict with dispense mechanisms in the center region of the pod.

In some embodiments, there may be a single motor coupled to two screws within the pod. This system would have a single motor that uses either a serpentine belt arrangement or a redundant set of drive pulleys to drive two driven pulleys mounted to the screws. There may be a single encoder used to track position. With this arrangement, belt tension, initial timing (or clocking) or components, and tolerances become much more critical. The ability to drive one screw more than the other to compensate for any unevenness or tilt is lost.

In some embodiments, there may be two motors and two screws, but only a single encoder. If there is any difference in drag between the two drives it would cause a potential binding situation as the system cannot detect the levelness of the mandrels and would not know the true position of each drive relative to the read point.

Figure 7:
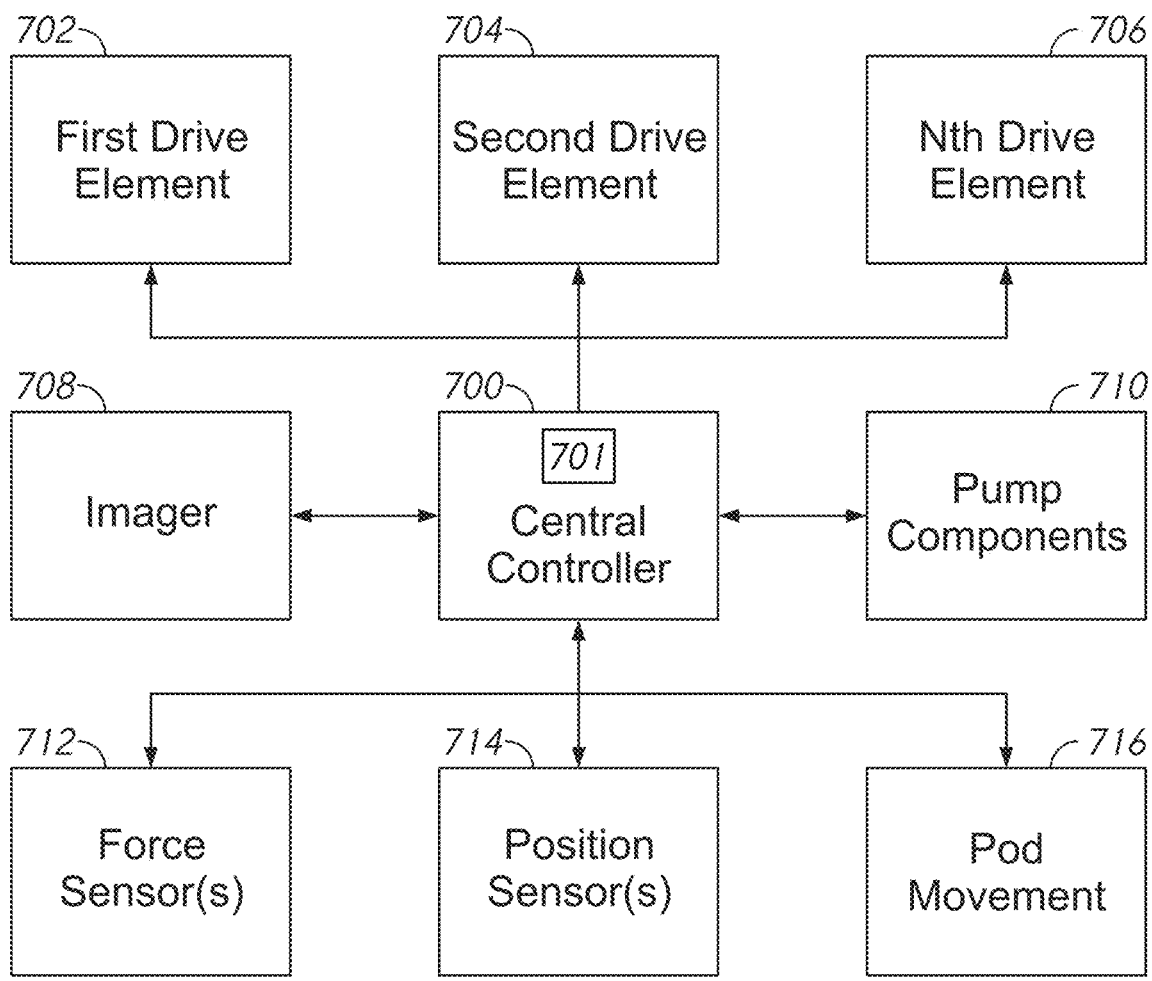
FIG. 7 shows a block diagram of a system according to an example embodiment of a lab automation workstation.

FIG. 7 shows a block diagram of a system according to an example embodiment of a lab automation workstation.

In some embodiments, there may be a number of drive elements, such as a first drive element 702 and a second drive element 704. There may be more drive elements as well, up to a Nth drive element 706. Each drive element may be any device or component capable of providing precise linear motion and downward force for tip-loading. Examples of drive elements include lead screws, ball screws, pistons, linear actuators, and so forth. Each drive element may interface with a central controller 700. The central controller 700 may send signals or instructions to control and operate the various drive elements. As previously described, these drive elements may be in the pod of the workstation. In some embodiments, there may be a platform including a first location, the platform configured to engage the first drive element 702 and the second drive element 704, wherein activation of the first drive element 702 and the second drive element 704 displaces the platform. In some embodiments, the first location may be offset from the first drive element 702 and from the second drive element 704.

There may also be one or more force sensors 712 in communication with the central controller 700. The force sensors 712 may be configured to measure the force being applied through the various drive elements. In some embodiments, there may be a force sensor corresponding to each drive element. For example, there may be a first force sensor configured to detect a first force from the first drive element 702, and there may be a second force sensor configured to detect a second force from the second drive element 704. In some embodiments, the force sensors may be integrated with the drive elements or the components that cause the drive elements to move. The force sensors 712 may communicate with the central controller 700 in order to report the forces associated with the different drive elements, such that the central controller 700 is provided feedback.

There may also be one or more position sensors 714 in communication with the central controller 700. In some embodiments, the position sensors 714 may be configured to measure various positions associated with the platform. For example, a there may be a first position sensor configured to measure a first position of the platform at a first location, as well as a second position sensor configured to measure a second position of the platform at a second location. As described herein, these position sensors 714 may be used to detect the tilt associated with the platform. In some embodiments, the position sensors 714 may be magnetic linear encoder strips corresponding to an encoder head; the position of the platform may be determined magnetically based on the position of the encoder head along the corresponding encoder strip.

There may be an imager 708 in communication with the central controller 700. In some embodiments, the imager 708 may relay information about the position of pipettes within a tip tray to the central controller 700. That information can be used by the central controller 700 in order to determine various approaches and algorithms for loading those pipette tips.

There may also be pump components 710 in communication with the central controller 700. The central controller 700 may issue signals or commands to the pump components 710 in order to perform pipetting operations with the pipettes that are in fluid communication with those pump components 710. In some embodiments, the pump components 710 are within the pod, along with the platform and the various drive elements.

The various devices or components for pod movement 716 may also be in communication with the central controller 700. In some embodiments, the central controller 700 may issue signals or commands to those components for pod movement 716 in order to move the pod around in the X, Y, and/or Z axis. Thus, the central controller 700 may control re-positioning of the pod in order to perform tip-loading and pipetting operations.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium 701, such as a random access memory (RAM), a read only memory (ROM), a magnetic medium such as a hard-drive or a floppy disk, or an optical medium such as a CD-ROM. Any such computer readable medium 701 may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A motion system comprising:
   a first drive element;
   a second drive element, the first drive element independently rotatable and independently controllable relative to the second drive element;
   a platform moveably coupled to the first and second drive elements, the platform movable linearly along the first and second drive elements in response to rotation of the first and second drive elements;
   a first position sensor connected to the platform for measuring a first relative position between the platform and the first drive element; and
   a first force sensor for measuring a first force applied through the first drive element to the platform when the first drive element rotates.

2. The motion system of claim 1, wherein the first drive element is a first drive screw, and wherein the second drive element is a second drive screw.

3. The motion system of claim 2, further comprising a second force sensor configured to detect a second force from the second drive screw.

4. The motion system of claim 2, wherein the platform further includes a second position sensor connected to the platform for measuring a second relative position between the platform and the second drive element.

5. The motion system of claim 4, wherein the first position sensor includes a first linear encoder and a second linear encoder, the first linear encoder connected to the first drive screw, wherein the first linear encoder extends along a length of the first drive screw, the second linear encoder connected to the second drive screw, wherein the second linear encoder extends along a length of the second drive screw.

6. The motion system of claim 5, further comprising a motor operatively coupled to the first drive screw.

7. The motion system of claim 1, wherein the platform includes a plurality of mandrels, each of the plurality of mandrels is adapted to be inserted into a respective, corresponding pipette tips.

8. A motion system comprising:
   a first drive element;
   a second drive element, the first drive element independently rotatable and independently controllable relative to the second drive element;
   a platform moveably coupled to the first drive element and the second drive element, the platform movable along the first and second drive elements in response to rotation of the first and second drive elements;
   a first position sensor capable of measuring a first relative position between the first drive element and the platform;
   a second position sensor capable of measuring a second relative position between the second drive element and the platform;
   a first force sensor capable of detecting a first insertion force applied to the platform upon insertion of the platform into a structure and in response to a first force applied by the first drive element, wherein the first insertion force is unevenly distributed across the platform; and
   a central controller for driving the platform, the central controller including a computer readable medium storing data instructions for driving the platform, wherein the data instructions, when executed by the central controller, cause the central controller to:
      calculate a first torque and a second torque based upon a set of parameters including: the first insertion force, the first relative position, and the second relative position; and
      send instructions to the first drive element to apply the first torque and send instructions to the second drive element to apply the second torque to counteract the unevenly distributed first insertion force;
   wherein the first force sensor is operatively coupled to the first drive element.

9. The motion system of claim 8, wherein the first drive element is a first drive screw, and wherein the second drive element is a second drive screw.

10. The motion system of claim 9, further comprising a second force sensor operatively coupled to the second drive screw, wherein the second force sensor is capable of detecting a second insertion force applied to the platform upon insertion of the platform into a structure and in response to a second force applied from the second drive screw.

11. The motion system of claim 10, wherein the first position sensor includes a first linear encoder connected to the first drive screw, the first linear encoder extending along a length of the first drive screw and wherein the second position sensor includes a second linear encoder connected to the second drive screw, the second linear encoder extending along the length of the second drive screw.

12. The motion system of claim 11, further comprising a motor operatively coupled to the first drive screw.

13. The motion system of claim 8, wherein the platform includes a plurality of mandrels, each of the plurality of mandrels is adapted to be inserted into a respective, corresponding pipette tips.

* * * * *